United States Patent
Ochi et al.

(10) Patent No.: US 7,034,967 B2
(45) Date of Patent: Apr. 25, 2006

(54) IMAGE READING APPARATUS AND TRANSPARENT ORIGINAL ADAPTER

(75) Inventors: Masahito Ochi, Chiba (JP); Hidehayu Tsukagoshi, Yokohama (JP); Takuya Shirahata, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/188,065

(22) Filed: Jul. 3, 2002

(65) Prior Publication Data

US 2003/0043351 A1 Mar. 6, 2003

Related U.S. Application Data

(63) Continuation of application No. 09/517,049, filed on Mar. 2, 2000, now abandoned, which is a continuation of application No. 09/060,290, filed on Apr. 14, 1998, now abandoned.

(30) Foreign Application Priority Data

Apr. 14, 1997 (JP) .................................. 9-096022

(51) Int. Cl.
*H04N 1/04* (2006.01)
(52) U.S. Cl. ...................... 358/487; 358/474; 358/475; 358/496; 358/497; 358/498; 399/367; 399/379; 399/380; 399/378; 399/220; 355/67
(58) Field of Classification Search ............... 358/487, 358/506, 509, 475, 497, 494, 505, 498, 496, 358/296, 474; 250/208.1, 234–236; 355/18, 355/67–71, 75; 348/96, 97; 399/378–380, 399/377, 367, 364, 220; 382/312, 318, 319
See application file for complete search history.

(56) References Cited

U.S. PATENT DOCUMENTS

| | | | |
|---|---|---|---|
| 4,575,230 A | 3/1986 | Carson et al. ................. 355/75 |
| 4,893,196 A | 1/1990 | Koshiyouji et al. .......... 358/474 |
| 5,038,227 A | 8/1991 | Koshiyouji et al. .......... 358/471 |
| 5,532,846 A * | 7/1996 | Brook et al. ................. 358/497 |
| 5,684,530 A | 11/1997 | White ......................... 348/131 |
| 5,754,314 A | 5/1998 | Araki et al. ................. 358/487 |
| 5,838,464 A * | 11/1998 | Fredlund et al. ............ 358/498 |
| 5,933,222 A | 8/1999 | Hoshino et al. .............. 355/75 |
| 5,940,650 A | 8/1999 | Inana et al. ................. 396/440 |
| 6,008,910 A * | 12/1999 | Ikeda et al. ................. 358/487 |

(Continued)

FOREIGN PATENT DOCUMENTS

JP 05122453 A * 5/1993

(Continued)

OTHER PUBLICATIONS

Nikon Super Coolscan Product Brochure, Nikon Corporation, 1995.

*Primary Examiner*—Cheukfan Lee

(57) ABSTRACT

An image reading apparatus for imaging an original document or photographic film includes an original placement bed on which to place the original, and a reading device to form an image of the original. A transparent original adapter, detachably connected to the image reading apparatus, includes a delivery device that moves the original along an original placement plane of the original placement bed. The transparent original adapter also includes a lighting device that illuminates the original as the reading device forms the image of the original. A film position adjustment device adjusts the original away from the original placement plane when the original is moved, and against the original when the image of the original is read by the reading device.

29 Claims, 11 Drawing Sheets

U.S. PATENT DOCUMENTS

| | | | |
|---|---|---|---|
| 6,111,668 A * | 8/2000 | Seo | 358/496 |
| 6,195,182 B1 * | 2/2001 | Kunishige | 358/487 |
| 6,252,684 B1 * | 6/2001 | Lin | 358/498 |
| 6,417,937 B1 * | 7/2002 | Batten et al. | 358/487 |
| 6,519,023 B1 * | 2/2003 | Chang | 355/18 |
| 2003/0002092 A1 * | 1/2003 | Tecu et al. | |
| 2003/0043351 A1 * | 3/2003 | Ochi et al. | |

FOREIGN PATENT DOCUMENTS

JP 9-65054 3/1997

* cited by examiner

IMAGE READING APPARATUS AND TRANSPARENT ORIGINAL ADAPTER

CROSS-REFERENCE TO RELATED APPLICATIONS

This application is based upon and claims priority of Japanese Patent Application No. 09-096022, filed Apr. 14, 1997, the contents being incorporated herein by reference. This application is a continuation of U.S. patent application Ser. No. 09/517,049, filed Mar. 2, 2000, now abandoned, which is a continuation of U.S. patent application Ser. No. 09/060,290 filed Apr. 14, 1998, now abandoned.

BACKGROUND OF THE INVENTION

The present invention relates to an image reading apparatus for reading an original photographic or document image. More particularly, the present invention relates to a transparent original have to move an original photographic or document image in an image reading apparatus.

An image reading apparatus for reading an original photographic or document image is known and is commonly referred to as an image scanner. The image scanner reads the original image upon receiving a command from a host computer, and outputs the image to the host computer. The host computer then displays the image on a display device, such as a monitor screen.

Prior art image scanners that are predominately available include a scanner commonly known as a flat bed scanner. Such flat bed scanners read image "reflective originals," or images that reflect, rather than allow light to be transmitted therethrough.

As illustrated in FIG. 11 (PRIOR ART), a prior art flat bed scanner 90 includes a scanner body 91 and a light shielding cover 92. Light shielding cover 92 is formed to entirely cover a platen glass 100 positioned above an upper surface of scanner body 91. One side of light shielding cover 92 is attached to scanner body 91 by a hinge 99, so that light shielding cover 92 pivots in a direction B about hinge 99.

For scanning the original, first light shielding cover 92 is pivoted about hinge 99 to an open position, and next the reflective original (not shown) is placed on platen glass 100 with a reading side facing down. The reflective original makes close contact with an original placement plane 88 of platen glass 100 by closing light shielding cover 92. The closing of light shielding cover 92 also helps to shield against external light.

An optical block 93 in scanner body 91 is positioned under platen glass 100. Optical block 93 is moved along platen glass 100 by an optical block driver (not shown), and includes a light source 94 that lights the reflective original on platen glass 100, a reflective mirror 95, a projection lens 96, a line sensor 97 that has a light receiving plane 89.

Light source 94 emits a linear form of light so that light irradiated from light source 94 lights the reflective original on platen glass 100 in a linear manner, after the luminous flux is adjusted by an optical system (not shown). After being reflected on reflective mirror 95, the light reflected on the reflective original reaches light receiving plane 89 of line sensor 97 through projection lens 96, and the image of the original is formed on light receiving plane 89 of line sensor 97.

A multiple number of photoelectric conversion elements are linearly arranged on light receiving plane 89 of line sensor 97. Electrical charges that correspond to the intensity of the reflected light representing the images of the original are accumulated in the photoelectric conversion elements. Subsequently, by sequentially transferring these individual electrical charges accumulated in the photoelectric conversion elements and processing the signals based upon these electrical charges, the image information of one line, or a single data line along a primary scanning direction, is read. This process is referred to as primary scanning.

Moreover, optical block 93 is moved in a direction F perpendicular to the arrangement direction of the photoelectric conversion elements on line sensor 97. As optical block 93 moves, line sensor 97 reads the image information of the single data line as line sensor 97 is moved in direction F. This process is referred to as secondary scanning. As a result of the primary and secondary scanning processes, the original image appearing on the reflective original on platen glass 100 is read in a two-dimensional manner.

Flat bed scanner 90 can also be used to read other types of transparent originals, such as 35 mm photographic film, by substituting the light shielding cover 92 with a transparent original adapter. The transparent original adapter (not shown) includes an independent light source and is formed to completely cover platen glass 100 of scanner body 91 in the same way as light shield cover 92.

To read a 35 mm film, the 35 mm film is placed directly on original placement plane 88 of platen glass 100 in the same way as with a reflective original. Light source 94 in optical block 93 is then turned off, and the independent light source (not shown) in the transparent original adapter is turned on. Light that has been transmitted through the 35 mm film while the independent light source is turned on is lead to optical block 93, thereby forming an image of the 35 mm film on the light receiving plane of line sensor 97 in a manner similar to the reflective original.

By using an independent light source on the transparent original adapter to illuminate the 35 mm film, it is possible to read, in a two-dimensional manner, the image of the 35 mm film on platen glass 100 by simply moving optical block 93 in the same manner as when reading the reflective original.

In recent years, a new film system has been developed, commonly referred to as an "Advanced Photo System" (APS). In the new standard film used for the APS system, a film having a magnetic memory domain (hereinafter referred to as a film) is stored inside a cartridge. The film remains in the cartridge even after the development process. As a result, a user does not have to touch the film after development or handle the film while the film is maintained within the cartridge.

SUMMARY OF THE INVENTION

It is therefore an object of the present invention to provide an image reading apparatus that easily reads an image on a film using a transparent original adapter.

It is another object of the present invention to provide an image reading apparatus that includes a transparent original adapter that can read an image on a film without damaging the film surface during a moving process of the film.

It is yet another object of the present invention to provide an inexpensive image reading apparatus that can read a photographic image of a film more rapidly.

It is a further object of the present invention to provide an image reading apparatus that has reduced noise effects.

Objects of the invention are achieved by a transparent original adapter detachably connectable to an image reading apparatus that forms an image of an original placed on an original placement plane. The transparent original adapter has a lighting device that projects light from the transparent original adapter towards the original placement plane to illuminate the original, and a delivery device that moves the original along the original placement plane as the image is formed.

Further objects of the invention are achieved by an image reading apparatus to reproduce a photographic image of a film that includes an original placement bed on which to place the film, a reading device to read the photographic image, and a transparent original adapter, detachably connected to the image reading apparatus, that is positioned over the original placement bed. The transparent original adapter includes a delivery device that moves the film along the original placement bed, and a lighting device, positioned over the original placement bed, to illuminate the film.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
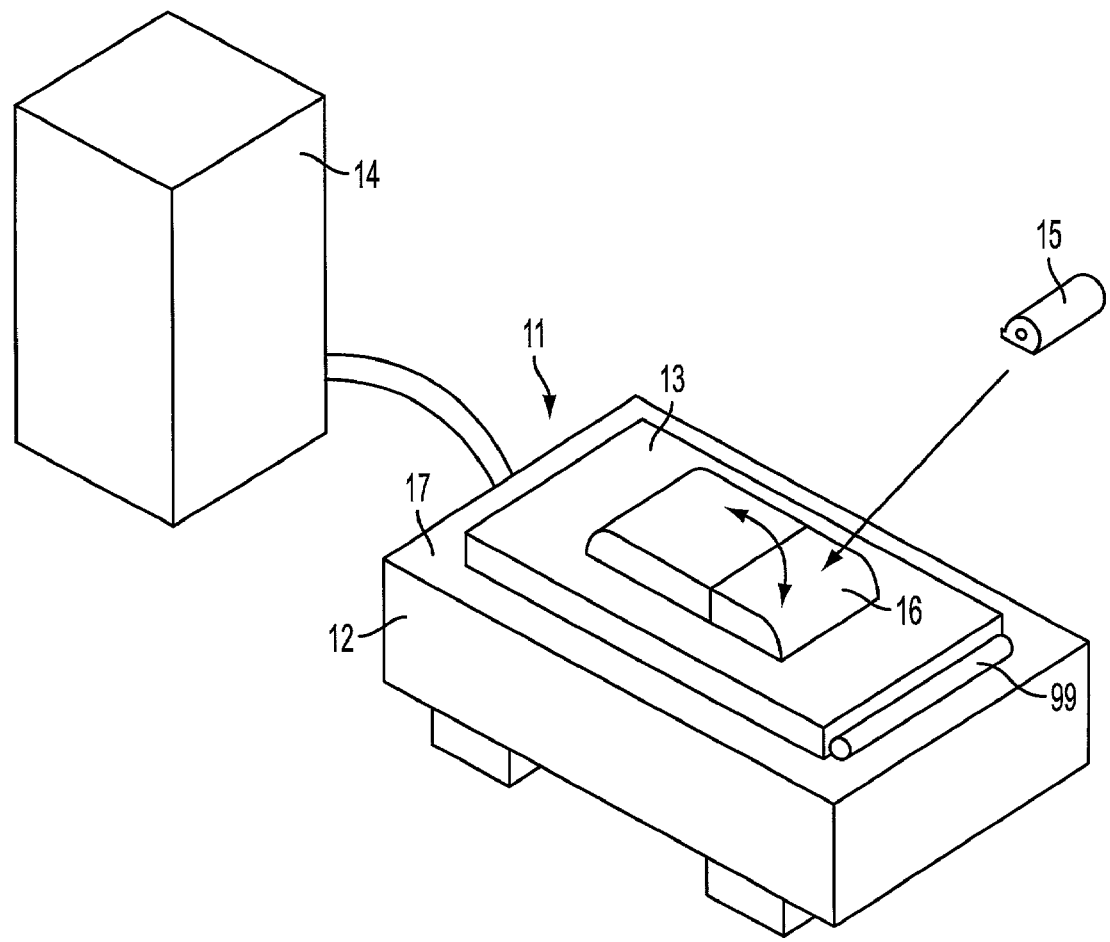
FIG. 1 is a perspective view of an image reading apparatus according to a preferred embodiment of the present invention.

Reference will now be made in detail to the preferred embodiments of the present invention, examples of which are illustrated in the accompanying drawings, wherein like reference numerals refer to like elements throughout.

Figure 2:
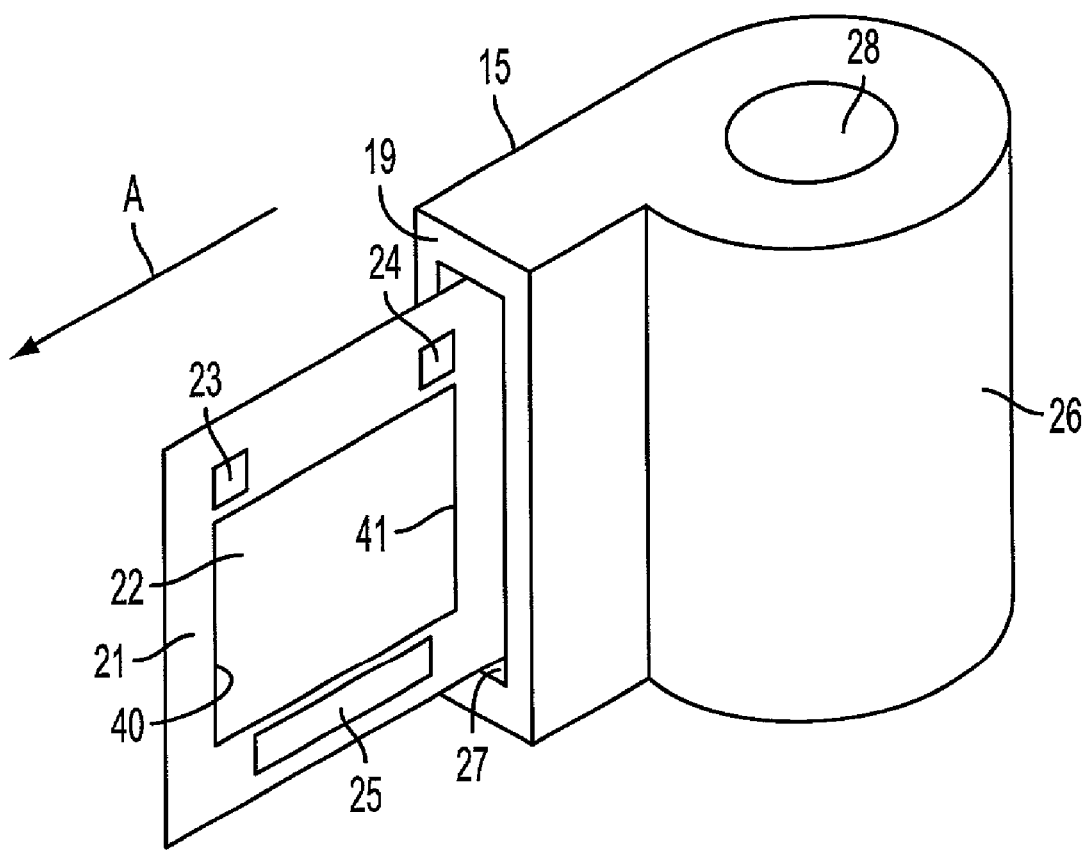
FIG. 2 is a perspective view of a film and a cartridge to be read in the image reading apparatus according to a preferred embodiment of the present invention.
Figure 3:
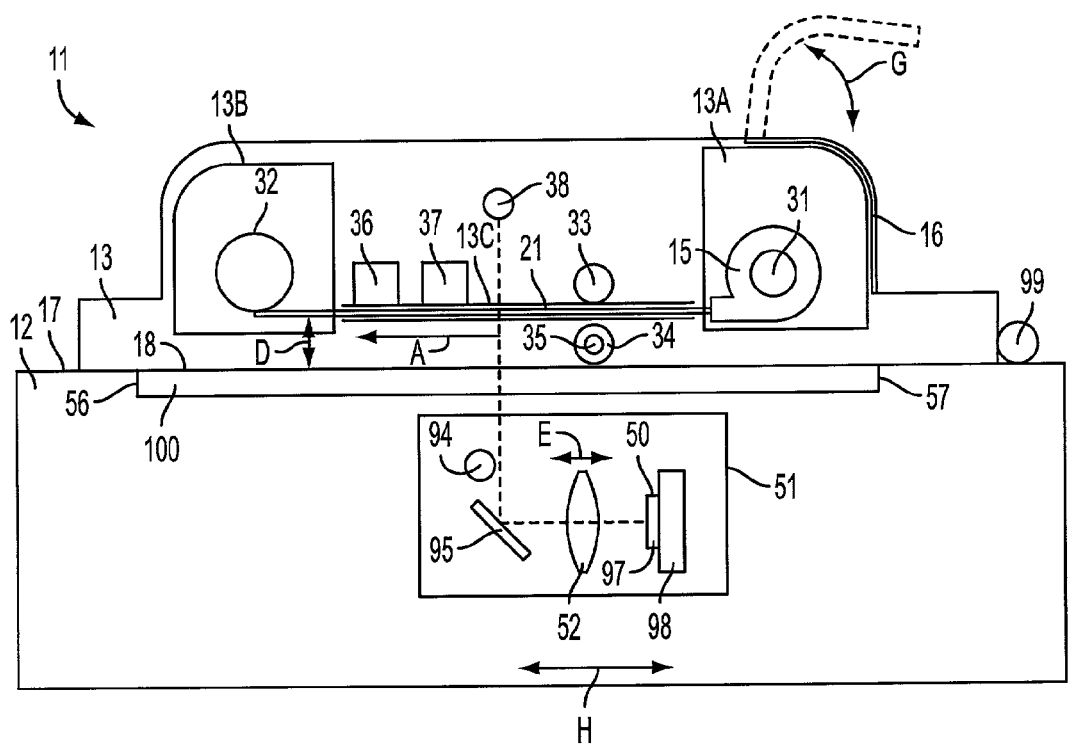
FIG. 3 is a cross-sectional view of a flat bed scanner according to a preferred embodiment of the present invention.

An image reading apparatus according to a preferred embodiment of the present invention is illustrated in FIG. 1. FIG. 2 is a perspective view illustrating a film 21 and a cartridge 15 that are loaded into a flat bed scanner 11. FIG. 3 is a cross-sectional view of flat bed scanner 11.

As illustrated in FIG. 1, flat bed scanner 11 is connected to a host computer 14 and includes a scanner body 12 and a transparent original adapter 13. Flat bed scanner 11 can read either an image of a reflective original, or an image of film 21 rolled in cartridge 15. Transparent original adapter 13 is positioned at a top surface 17 of scanner body 12 to shield external light. Cartridge 15 is loaded within transparent original adapter 13 and a delivery mechanism (not shown) is provided on transparent original adapter 13 to facilitate a reading process of the image of film 21 and will be described later.

An end of transparent original adapter 13 is detachably connected to scanner body 12 by a hinge 99, for example, so that transparent original adapter 13 opens and closes by pivoting about hinge 99. As illustrated in FIG. 3, by opening or closing transparent original adapter 13, original placement plane 18 of a platen glass 100, which is provided for placement of a reflective original, appears or is covered by transparent original adapter 13, similar to a conventional light shielding cover. As illustrated in FIGS. 1 and 3, an open/close lid 16, positioned on top of transparent original adapter 13, is pivoted in direction G to allow access to a cartridge chamber 13A within transparent original adapter 13.

An explanation will now be provided for cartridge 15, as well as film 21 rolled therein, that is loaded in cartridge chamber 13A.

As illustrated in FIG. 2, a slit-like opening 27 is formed on a side 19 of a cylindrical case 26 of cartridge 15. A cartridge spool 28 supported in a center of cylindrical case 26 rotates in an axial portion of cylindrical case 26. A base end (not shown) of film 21 is fixed to cartridge spool 28 and is rewound entirely onto cartridge spool 28 when film 21 is stored inside cylindrical case 26. Film 21 is advanced from cartridge 15 through slit-like opening 27 in a direction A as cartridge spool 28 rotates in a counter clockwise direction. Film 21 is rewound onto cartridge 15 as cartridge spool 28 rotates in an opposite or clockwise direction.

An image memory domain 22, two perforations 23 and 24, and a magnetic memory domain 25 are formed on each frame of film 21. In each magnetic memory domain 25, photographic information such as frame number, title, date and time of photography, photographic conditions, and specified print size are recorded. Perforations 23 and 24 are used to indicate a beginning point 40 and an ending point 41 of image memory domain 22 of film 21.

Figure 4:
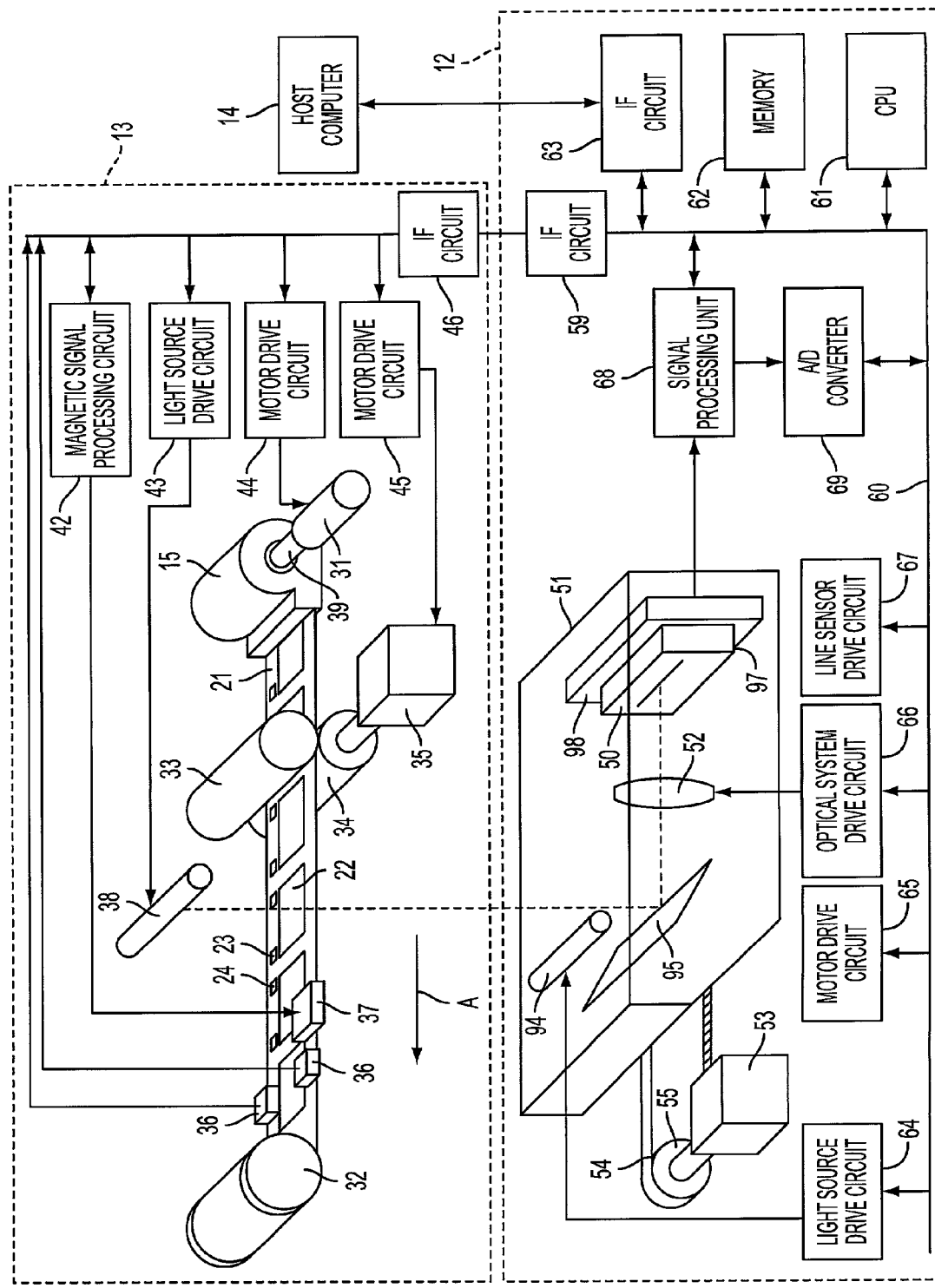
FIG. 4 is a schematic view of the flat bed scanner of FIG. 3.

Next, an explanation regarding an internal configuration of flat bed scanner 11 will be provided with reference to FIGS. 3 and 4. As noted above, flat bed scanner 11 reads both the reflective original image and film 21 image. However, only the reading of the film 21 loaded into transparent original adapter 13 is illustrated in FIGS. 3 and 4 in order to simplify the explanation.

As illustrated in FIG. 3, platen glass 100 of flat bed scanner 11 is positioned on top surface 17 of scanner body 12. Platen glass 100 is covered entirely by transparent original adapter 13 when transparent original adapter 13 is closed. An interior portion of transparent original adapter 13 is compartmentalized into sections, including cartridge chamber 13A in which cartridge 15 is loaded, and a film space 13B for storing film 21 which is advanced outside of cartridge 15 as film 21 is loaded.

As illustrated in FIGS. 2, 3 and 4, cartridge chamber 13A includes a fork shaft 39 that engages with cartridge spool 28 when cartridge 15 is loaded, and a DC motor 31 that rotates fork shaft 39. A take-up spool 32 provided in film space 13B winds film 21. A rotation shaft (not shown) of take-up spool 32 is linked with a rotation shaft (not shown) of DC motor 31 through a gear mechanism (not shown). As a result, fork shaft 39 and take-up spool 32 are interlocked for rotation when DC motor 31 drives.

Consequently, when DC motor 31 rotates in a clockwise direction as cartridge 15 is loaded, film 21 is advanced from cartridge 15. The advanced film 21 is wound onto take-up spool 32 so that film 21 is carried from cartridge chamber 13A to film space 13B at a relatively high speed.

Installation locations for fork shaft 39 and take-up spool 32 are predetermined so that a film passing plane 13C above which film 21 passes during moving of film 21 maintains a specified distance D from original placement plane 18 of platen glass 100 so that film 21 does not make contact with the platen glass 100.

Film 21 is positioned between a tension roller 33 and a scan roller 34 inside of transparent original adapter 13 that move film 21 in minute steps in direction A. Tension roller 33 is positioned opposite scan roller 34 on either side of film passing plane 13C. A stepping motor 35 is linked with scan roller 34 and rotates scan roller 34 in minute intervals of steps.

When film 21 is moved so that cartridge 15 is loaded to read the image of the original, movement of film 21 by DC motor 31 is stopped. Subsequently, film 21 is moved in steps in direction A at constant, minute incremental steps with respect to an optical block 51, which will be described later, through rotation of scan roller 34 by stepping motor 35.

As a result of the minute stepped movement of film 21, line sensor 97 is moved in minute steps in a reverse direction of direction A relative to film 21. Based upon this relative, minute movement, secondary scanning is executed for the image of the original, and will be described later. In this case, direction A and the secondary scanning direction of film 21 are the same.

A position detection sensor 36 and a magnetic head 37 are positioned above film passing plane 13C. As illustrated in FIG. 4, position detection sensor 36 is positioned at a location to which the sides of perforations 23 and 24 of film 21 are adjacent. In addition, magnetic head 37 is positioned at a location to which the sides of magnetic memory domain 25 of film 21 are adjacent.

As illustrated in FIGS. 3 and 4, a light source 38 is fixed at a predetermined location above film passing plane 13C. In a preferred embodiment of the present invention, a white linear light source is used as light source 38.

In addition, an optical system (not shown) is provided between light source 38 and film passing plane 13C that irradiates image memory domain 22 of film 21 with a luminous flux from light source 38. The optical system irradiates in a single line or linear manner. A direction of irradiation of the line of luminous flux linearly irradiating image memory domain 22 is perpendicular to direction A of film 21.

As illustrated in FIGS. 3 and 4, optical block 51 is placed inside of scanner body 12 under platen glass 100. A light source 94, a reflective mirror 95, a projection lens 52, a line sensor 97, and a printed circuit board 98 on which line sensor 97 is mounted, are provided on optical block 51.

Light source 94 illuminates the reflective original placed on platen glass 100 during reading of the reflective original. As with light source 38 of transparent original adapter 13, light source 94 uses a linear white light source.

Projection lens 52 forms an image of the light received from the original on a light receiving plane 50 of line sensor 97. Projection lens 52 adjusts reflected light which has reached the reflected original from light source 94 to form an image when reading the reflective original. Moreover, when reading film 21, projection lens 52 adjusts light transmitted through film 21 to form the image of the original on film 21. As illustrated in FIG. 3, projection lens 52 is moved, for example, in a direction E by rotation of a motor (not shown).

When light sources 38 and 94 are white light sources having linear lights as described above, line sensor 97 includes three line sensors (not shown), an image sensor for the red color, an image sensor for the green color, and an image sensor for the blue color. Light receiving plane 50 is formed on each sensor by a multiple number of photoelectric conversion elements arranged in a linear manner along a single line in an irradiation direction. An electrical charge in each image sensor corresponding to the intensity of the light that has entered the photoelectric conversion elements corresponding to the optical image is accumulated. Consequently, primary scanning involves individually reading a line of information, sequentially transferring the electrical charge accumulated in the linear arranged photoelectric conversion elements, and processing the signal based on the electrical charge.

As illustrated in FIGS. 3 and 4, a belt 54 is installed on optical block 51 and is suspended around a first pulley 55 and a second pulley (not shown) within scanner body 12. An appropriate tension is provided to belt 54 to move optical block 51. A stepping motor 53 rotates in minute stepped intervals to rotate first pulley 55.

As illustrated in FIG. 3, when reading the reflective original, optical block 51 is moved in a secondary scanning direction, perpendicular to a core of line sensor 97, at constant, minute, stepped intervals with respect to platen glass 100 as first pulley 55 is rotated by stepping motor 54.

During a line reading operation of film 21, stepping motor 53 does not rotate, so that optical block 51 is momentarily fixed at a predetermined reading position where an optical axis of projection lens 52 corresponds with an optical axis of the luminous flux from light source 38. Optical block 51 begins moving in a direction H, corresponding to the secondary scanning direction, as stepping motor 53 begins to rotate as described above. Subsequently, line sensor 97 is moved in minute steps relative to the reflective original on platen glass 100, to execute secondary scanning.

When optical block 51 is fixed at the predetermined reading position, film 21 is moved by rollers 33 and 34 in minute steps in direction A by driving of stepping motor 35 of transparent original adapter 13, thereby executing secondary scanning by line sensor 97.

Next, an explanation is provided regarding an electrical configuration of flat bed scanner 11 of the above-described preferred embodiment of the present invention. As illustrated in FIG. 4, scanner body 12 includes a central processing unit ("CPU") 61, a memory 62, interface circuits ("IF circuits") 63 and 59, a light source drive circuit 64, a motor drive circuit 65, an optical system drive circuit 66, a line sensor drive circuit 67, a signal processing circuit 68, and an A/D converter 69 are connected to CPU 61 through a data bus 60.

Similarly, transparent original adapter 13 includes a magnetic signal processing circuit 42, a light source drive circuit 43, motor drive circuits 44 and 45, and an interface circuit ("IF circuit") 46. IF circuit 46 of transparent original adapter 13 is electrically connected to IF circuit 59 of scanner body 12, thereby connecting magnetic signal processing circuit 42, light source drive circuit 43, and motor drive circuits 44 and 45 of transparent original adapter 13 side with CPU 61 on scanner body 12 side.

IF circuits 63 and 59 of scanner body 12, as well as IF circuit 46 of transparent original adapter 13 are connected through a Small Computer System Interface ("SCSI"). Memory 62 is a program memory or a working memory. IF circuit 46 may be an interface connected through data bus 60.

CPU 61 is also connected to host computer 14 through IF circuit 63. When signals indicating various commands such as designation of a subject to be read, or specifying which type of original image, either the reflective original or film 21, that is to be read, are entered in CPU 61 using a keyboard or a mouse (not shown) connected to host computer 14 through IF circuit 63. CPU 61 executes various controls using drive circuits 64–67 or signal processing circuit 68 according to the commands and program that have been set in memory 62.

An explanation is provided below regarding the specific control operations by signal processing circuit 68 and drive circuits 64–67 connected to CPU 61.

As illustrated in FIG. 4, light source drive circuit 43 of transparent original adapter 13 activates light source 38 for the transparent original based on a command from CPU 61. More specifically, light source drive circuit 43 turns on light source 38 when reading film 21, and turns off light source 38 when reading the reflective original. As a result of the operation of light source drive circuit 43, the luminous flux of the light emitted from light source 38 is adjusted, as noted earlier, to irradiate image memory domain 22 of film 21 in a linear manner. At this time, light transmitted through film 21 enters scanner body 12 and reaches the multiple linearly arranged photoelectric conversion elements of light receiving plane 50 of line sensor 97 through projection lens 52, after being reflected at reflective mirror 95. Subsequently, the image of the original on film 21 is formed on light receiving plane 50 of line sensor 97.

Light source drive circuit 64 on scanner body 12 side activates light source 94 for the reflective original based upon commands from CPU 61. More specifically, light source drive circuit 64 turns on light source 94 when reading the reflective original and turns off light source 94 when reading film 21. As a result, light emitted from light source 94 is adjusted by an optical system (not shown) to irradiate the reflective original placed on platen glass 100 in a linear manner. The light reflected by the reflective original reaches light receiving plane 50 of line sensor 97 through projection lens 52 after being reflected at reflective mirror 95. Subsequently, the image of the original on the reflective original is formed on light receiving plane 50 of line sensor 97.

As illustrated in FIG. 4, when reading film 21, optical system drive circuit 66 located on scanner body 12 adjusts the position of projection lens 52 so that transmitted light from film 21 forms an image on light receiving plane 50 of line sensor 97, as described above, according to instructions from CPU 61. Moreover, when reading the reflective original, optical system drive circuit 66 adjusts the position of projection lens 52 so that light reflected on the reflective original forms an image on light receiving plane 50 of line sensor 97 as described above.

Moreover, line sensor drive circuit 67 drives line sensor 97 according to instructions from CPU 61, thereby controlling time to accumulate an electrical charge corresponding to the incident light of the light entering the multiple number of linearly arranged photoelectric conversion elements, as well as controlling transfer of the accumulated electrical charge to signal processing circuit 68. The electrical charge accumulated in each photoelectric conversion element of line sensor 97 is sequentially transferred to the transfer path corresponding to primary scanning. Thus, a primary scanning direction is a direction in which the photoelectric conversion elements, to which the electrical charge is transferred, are arranged. More specifically, the primary scanning direction is the direction of linear arrangement of the photoelectric conversion elements, corresponding to an axial direction of line sensor 97.

As illustrated in FIG. 4, signal processing circuit 68 connected to line sensor 97 amplifies an analog image signal corresponding to the electrical charge from line sensor 97 and processes other signals based upon commands from CPU 61. Other signal processes include a correlational double sampling process, a shading compensation process, a dark current compensation process, and an odd and even number compensation process. Signal processing circuit 68 outputs the processed analog image signals to A/D converter 69.

A/D converter 69 converts the analog image signal from signal processing circuit 68 into a digital signal with a specified number of bits, 8-bit for example, and outputs the digital signal to CPU 61 through data bus 60 as a signal indicating the line data. CPU 61 stores the digital signal indicating the line data in memory 62. Subsequently, CPU 61 outputs the line data stored in memory 62 to host computer 14 through IF circuit 63 as needed.

Motor drive circuit 65 of scanner body 12 rotates stepping motor 53 based upon a command from CPU 61 during reading of the reflective original, thereby moving optical block 51 entirely in minute steps (minute movement) in direction H, corresponding to the secondary scanning direction, with respect to platen glass 100 as described above. Minute movement of the entire optical block 51 is executed synchronously with transfer of the electrical charge in line sensor 97 by line sensor drive circuit 67 described above. Motor drive circuit 65 moves optical block 51 to the above described predetermined reading position and maintains optical block 51 in a stop mode at the predetermined reading position.

Motor drive circuits 44 and 45 on transparent original adapter 13 rotate DC motor 31 and stepping motor 35 according to instructions from CPU 61 connected through IF circuits 46 and 59 and data bus 60. More specifically, when reading film 21, motor drive circuit 44 rotates in a clockwise or counter-clockwise direction, thereby rotating interlocking fork shaft 39 and take-up spool 32 linked with DC motor 31. Thus, film 21 is advanced from cartridge 15 in direction A while being wound onto take-up spool 32, or in the opposite direction to be rewound onto cartridge 15. Movement of film 21 by DC motor 31 is executed at a high rate of speed, both for moving frames and for reading the image of film 21.

As illustrated in FIGS. 3 and 4, during movement of film 21 by DC motor 31, tension roller 33 is placed slightly away from scan roller 34 to facilitate the passing of film 21 during the film movement process, as well as to prevent film 21 and scan roller 34 from damaging each other by friction.

While film movement is stopped, motor drive circuit 45 rotates stepping motor 35 according to a command from CPU 61 to move scan roller 34 a constant, minute distance in direction A described above. At the same time, tension roller 33 is also minutely moved as tension roller 33 is forced towards scan roller 34. Due to the movement of tension roller 33 and scan roller 34, film 21 is moved at constant, minute increments in direction A.

Movement of film 21 takes place synchronously with the transfer control of the electrical charge in line sensor 97 by line sensor drive circuit 67 when reading the image on film 21, or when reading or writing magnetic information. Moreover, film position detection sensor 36 on transparent original adapter 13 detects perforations 23 and 24 on film 21 during movement of film 21 by DC motor 31. CPU 61 identifies the frame number of film 21 located on film passing plane 13C based on a signal received from film position detection sensor 36.

As illustrated in FIG. 4, magnetic signal processing circuit 42 on transparent original adapter 13 drives magnetic head 37 during movement of film 21, using stepping motor 35, in order to read the magnetic information in magnetic memory domain 25 of film 21, or to write new information in magnetic memory domain 25. While reading the magnetic information, magnetic signal processing circuit 42 digitizes the signal indicating the magnetic information that has been read and outputs the signal to CPU 61. CPU 61 stores the magnetic information indicated by the received signal in memory 62. Subsequently, CPU 61 outputs the magnetic information stored in memory 62 to host computer 14 through IF circuit 63 as needed.

Projection lens 52, line sensor 97, printed circuit board 98, optical system drive circuit 66, line sensor drive circuit 67, signal processing circuit 68, and A/D converter 69 correspond to a reading device.

Belt 54, first pulley 55, stepping motor 53, and motor drive circuit 65 correspond to a moving device. Fork shaft 39, DC motor 31, take-up spool 32, tension roller 33, scan roller 34, stepping motor 35, and motor drive circuits 44 and 45 correspond to a delivery device.

Light source 38 and light source drive circuit 43 correspond to a lighting device. Projection lens 52 corresponds to an imaging optical device. Line sensor 97 corresponds to a photoelectric conversion device. Optical system drive circuit 66 corresponds to an adjustment device. Magnetic head 37 and magnetic signal processing circuit 42 correspond to a magnetic information reading device and a magnetic information writing device.

Next, an explanation is provided regarding an operation of flat bed scanner 11 according to a preferred embodiment of the present invention. As described above, flat bed scanner 11 reads images of both the reflective original and film 21. Each reading operation is described below.

When reading film 21, a user enters information indicating that film 21 is the subject to be read by using an input device of host computer 14. User also inputs information specifying the frame number that is to be read on film 21 and opens open/close lid 16 of transparent original adapter 13 to load cartridge 15 in flat bed scanner 11. Host computer 14 sends the input information to CPU 61 of scanner body 12 through IF circuit 63 as a film reading command.

As illustrated in FIG. 4, CPU 61 receives the instruction to read film 21 from host computer 14, stores the specified frame number in memory 62, and drives light source drive circuit 64 to turn off light source 94. In addition, CPU 61 drives motor drive circuit 65 to move optical block 51 and stop optical block 51 at the predetermined reading position. CPU 61 drives optical system drive circuit 66 to adjust the position of projection lens 52 along the optical axis so that the image on film 21 forms an image at light receiving plane 50.

While rotating DC motor 31 to advance film 21 from cartridge 15, CPU 61 identifies the frame number on film 21 that is located at the film passing plane 13C based upon a signal from film position detection sensor 36. CPU 61 ceases to rotate DC motor 31, stopping movement of film 21, when the identified frame number matches the specified frame number stored in memory 62. CPU 61 then drives stepping motor 35 to move film 21 with tension roller 33 and scan roller 34 until a beginning point of image memory domain 22 on the frame specified by host computer 14 reaches an image reading position, or a point where the luminous flux from light source 38 intersects with film passing plane 13C.

CPU 61 then drives light source drive circuit 43 according to the film reading command to turn on light source 38. At this time, light emitted from the light source 38 is transmitted through beginning point 40 of image memory domain 22 in a linear manner, or a single line, and is reflected at reflective mirror 95 and received at the light receiving plane of line sensor 97 from projection lens 52.

As illustrated in FIG. 4, CPU 61 drives line sensor drive circuit 67, signal processing circuit 68, and A/D converter 69 to obtain the linear form of the analog image signal for the specified frame (primary scanning), as well as to convert the analog image signal into a digital signal and subsequently output the digital signal to host computer 14.

CPU 61 executes the reading operation for the image signal while driving stepping motor 35 to move film 21 in direction A. The minute movement is performed from beginning point 40 to end point 41 of image memory domain 22. When the reading operation for the image signal is executed through to end point 41 of image memory domain 22 (secondary scanning), the reading operation for image memory domain 22 is completed and a two-dimensional image plane is obtained. Host computer 14 then displays the image that has been read using an output display device, such as a monitor screen (not shown).

CPU 61 repeats the above described reading operation until all images of specified frames stored in memory 62 by the film reading command are read. When host computer 14 side has confirmed that all frames have been read, an eject command is transmitted from host computer 14 to CPU 61. Upon receiving the eject command, CPU 61 reverses the driving of DC motor 31, thereby rewinding film 21 back into cartridge 15. When the rewinding process is completed, open/close lid 16 is opened by the user and cartridge 15 is removed from cartridge chamber 13A.

When reading film 21, CPU 61 reads the magnetic information stored in magnetic memory domain 25 on film 21 using magnetic head 37. The magnetic information is then sent to host computer 14. Subsequently, host computer 14 calculates the most appropriate image quality compensation parameter, based on the magnetic information, to perform an image quality compensation process most suitable for the image that has been read. The parameters used for this compensation process for image quality may also be written in magnetic memory domain 25 on film 21 using magnetic head 37.

When reading the reflective original, the user enters information indicating that the reflective original is the subject to be read through an input device of host computer 14 and places the reflective original on platen glass 100 while maintaining open/close lid 16 of transparent original adapter 13 in the open position.

As illustrated in FIG. 4, host computer 14 sends information transmitted to CPU 61 through IF circuit 63 as a reflective original reading command. Upon receiving the reflective original reading command from host computer 14, CPU 61 drives light source drive circuit 43 to turn off light source 38 used for the transparent original, and adjusts projection lens 52 to be positioned so that the image of the reflective original is formed as light reflected at the reflected original reaches light receiving plane 50 of line sensor 97.

As illustrated in FIGS. 3 and 4, CPU 61 rotates stepping motor 53 to move optical block 51 to the reading start position corresponding at a starting point 56 of platen glass 100, and drives light source drive circuit 64 to turn on light source 94. Light emitted from light source 94 irradiates the reading start position for the reflective original in a linear manner. The reflected light at this reading start position is reflected by reflective mirror 95 onto light receiving plane 50 of line sensor 97 by projection lens 52.

As when reading film 21, CPU 61 drives line sensor drive circuit 67, signal processing circuit 68, and A/D converter 69 to output the linear form of the image signal for the reflective original to host computer 14. CPU 61 executes the reading operation for the image signal while minutely moving optical block 51 in direction H corresponding to the secondary scanning direction by driving stepping motor 53. This minute movement is performed in direction H from the reading start point corresponding to starting point 56 of platen glass 100 towards a reading end point 57 of platen glass 100.

When the reading operation for the linear form of the image signal is executed to reading end point 57, the reading operation for the reflective original is completed and a two-dimensional image plane is obtained. Host computer 14 then displays the image of the image plane that has been read through an output device, such as a monitor screen (not shown).

As explained above, detachably connecting transparent original adapter 13 to flat bed scanner 11 enables both the image of the reflective original and of film 21 accommodated in cartridge 15 to be easily read. Moreover, using flat bed scanner 11, film 21 is moved without making contact with original placement plane 18 of platen glass 100 when reading film 21, thereby avoiding damage between the film surface and platen glass 100. In addition, since the position of projection lens 52 can be adjusted as needed by CPU 61 and optical system drive circuit 66, a clear image is read even if the images are at different positions, such as when the original is placed over original placement plane 18 of platen glass 100 and when film 21 is located above original placement plane 18 at a distance D.

Flat bed scanner 11 reads the images on both the reflective original and transparent original. If the image of a transparent original, such as a 35 mm film, is to be read, light source 38 can be configured so that light source 38 is moved synchronously with movement of optical block 51.

It is assumed that flat bed scanner 11 uses a light source that emits a linear light, such as light source 38. However, flat bed scanner 11 may also use a light source that emits a plane light. When light source 38 is configured to emit a plane light, a two-dimensional area sensor may be used in place of line sensor 97. As a result, the movement of film 21 can be controlled frame by frame, thereby eliminating the need to execute the minute movements required for secondary scanning.

In the above described preferred embodiment of the present invention, secondary scanning is executed by the movement of film 21 using tension roller 33, scan roller 34, and stepping motor 35. However, secondary scanning may also be executed by moving film 21 using a mechanism to control the delivery speed of DC motor 31 according to changes in volume of film 21 on spools 28, 32. Since the delivery speed of DC motor 31 changes as the volume of film 21 on cartridge spool 28 changes, film 21 can also be moved in minute steps using DC motor 31 based on the changes in volume. Moreover, when film 21 is moved using DC motor 31, the magnetic information may be read, or written, while executing the movement.

Figure 5:
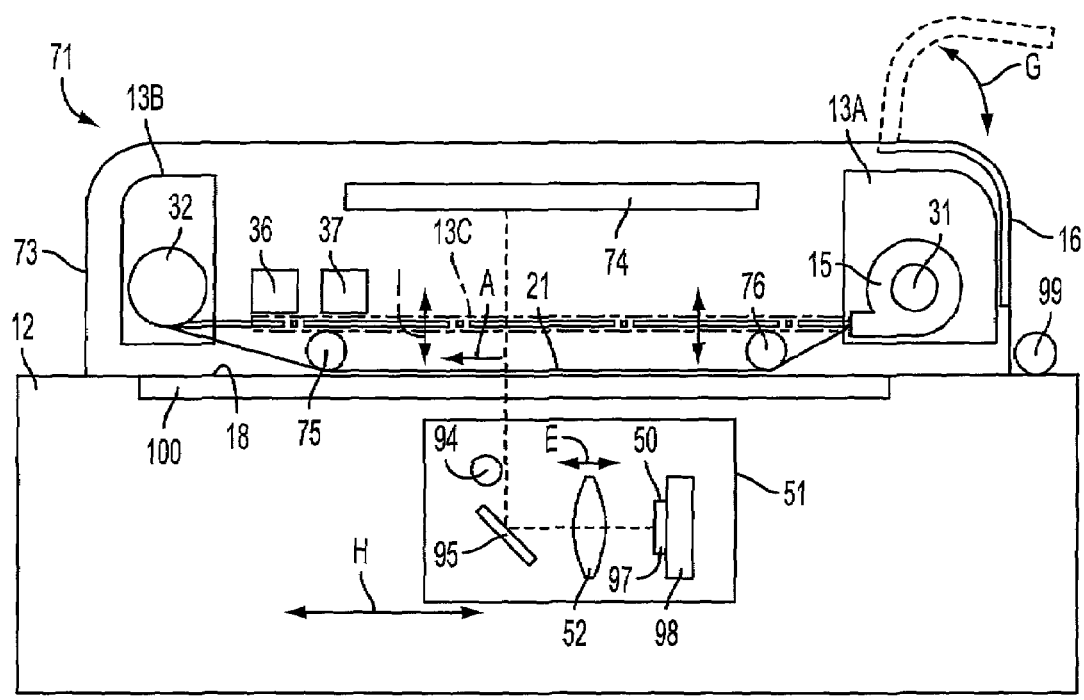
FIG. 5 is a cross-sectional view of a flat bed scanner according to a preferred embodiment of the present invention.
Figure 6:
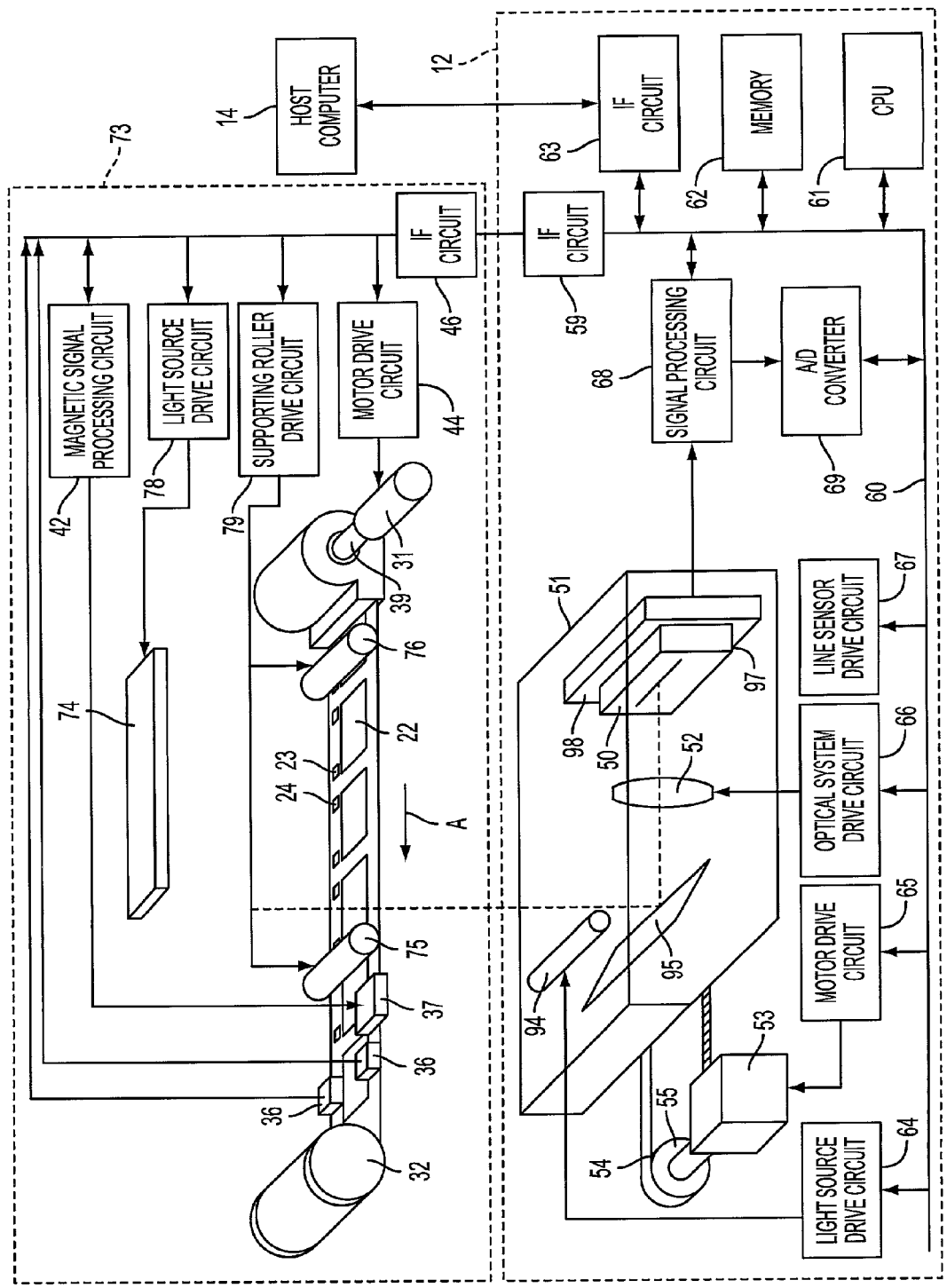
FIG. 6 is a schematic view of the flat bed scanner of FIG. 5.

Next, an explanation is provided regarding a flat bed scanner 71 of a second preferred embodiment of the present invention. FIG. 5 is a cross-sectional view of an internal configuration of flat bed scanner 71 according to the second preferred embodiment. FIG. 6 is a block diagram illustrating an electrical configuration of flat bed scanner 71 according to the second preferred embodiment.

Although capable of reading images on both the reflective original and film 21, an explanation of flat bed scanner 71 according to the second preferred embodiment of the present invention has been limited to reading images on film 21 in order to simplify the description.

As illustrated in FIGS. 5 and 6, flat bed scanner 71 according to the second preferred embodiment differs from flat bed scanner 11 of the first preferred embodiment in the following aspects. During reading of film 21 using flat bed scanner 71 of the second preferred embodiment, the position of film 21 is fixed. While film 21 remains fixed, optical block 51 is minutely moved in direction A, thereby attaining a two-dimensional image of image memory domain 22 on film 21. As a result, flat bed scanner 71 of the second preferred embodiment does not include tension roller 33, scan roller 34, or stepping motor 35 to move film 21 on flat bed scanner 71 during the reading operation.

In addition, the second preferred embodiment includes a plane lighting unit 74, which is an light source on flat bed scanner 71 that emits a plane light that simultaneously lights at least one image memory domain 22 on film 21. However, a light source that emits a linear light may be used rather than a light source that emits a plane light. CPU 61 synchronously controls the movement of the light source and optical block 51, so that light on film 21 enters line sensor 97.

The reflective original is read on flat bed scanner 71 of the second preferred embodiment in the same manner as with the first preferred embodiment. The exterior configuration of flat bed scanner 71 in the second preferred embodiment is the same as with flat bed scanner 11 of the first preferred embodiment, illustrated in FIG. 1. Moreover, the internal configuration of scanner body 12 corresponding to flat bed scanner 71 of the second preferred embodiment is the same as scanner body 12 of flat bed scanner 11 in the first preferred embodiment.

In FIGS. 5 and 6, the components that are identical with those illustrated in FIGS. 3 and 4 are labeled with the same numbers and the explanation, thereof, is omitted when appropriate.

As illustrated in FIG. 5, film 21 is loaded in a transparent original adapter 73 of flat bed scanner 71. Transparent original adapter 73 includes a cartridge chamber 13A positioned from a film space 13B so that multiple numbers (three frames or more) of image memory domain 22 on film 21 are positioned between cartridge chamber 13A and film space 13B when cartridge 15 is loaded.

When cartridge 15 is initially loaded, film 21 is positioned along a film passing plane 13C and two film supporting rollers 75 and 76 are positioned above film passing plane 13C. As illustrated in FIGS. 5 and 6, film supporting rollers 75 and 76 move in a direction perpendicular to film passing plane 13C and are pressed against, or away from, the original placement plane of platen glass 100. For example, FIG. 5 illustrates film supporting rollers 75 and 76 pressed against platen glass 100 and FIG. 6 illustrates film supporting rollers 75 and 76 positioned away from platen glass 100.

As illustrated in FIG. 6, when cartridge 15 is loaded, three image memory domains 22 are maintained between film supporting rollers 75 and 76. Plane lighting unit 74 is positioned over film passing plane 13C on transparent original adapter 73, and includes, for example, a diffusion plate and a light emitting diode arranged two-dimensionally. Light from the light emitting diode is emitted in a plane through a diffusion plate.

As illustrated in FIG. 6, plane lighting unit 74 is large enough to simultaneously light an entire area of image memory domain 22 of film 21 located between film supporting rollers 75 and 76. The area on film 21 that can be lit by plane lighting unit 74 is hereinafter referred to as the "reading area." Film position detection sensor 36 and magnetic head 37 are positioned outside of the reading area.

When reading film 21, optical block 51 is moved in constant intervals of minute steps in direction A by driving of stepping motor 53, in the same manner as for reading the reflective original. More specifically, line sensor 97 is moved in minute steps relative to film 21 within transparent original adapter 73, thereby executing secondary scanning based upon movement of line sensor 97.

Next, an electrical configuration of flat bed scanner 71 according to the second preferred embodiment of the present invention is described.

As illustrated in FIG. 6, magnetic signal processing circuit 42, a light source drive circuit 78, a supporting roller drive circuit 79, motor drive circuit 44, and IF circuit 46 are positioned on transparent original adapter 73 and connected to CPU 61 through IF circuit 59 on scanner body 12 side and data bus 60.

Light source drive circuit 78 activates plane lighting unit 74 based upon an instruction from CPU 61. More specifically, light source drive circuit 78 turns on plane lighting unit 74 when reading film 21 and turns off plane lighting unit 74 when reading the reflective original.

During reading of film 21, light irradiated from plane lighting unit 74 simultaneously illuminates each image memory domain 22 area on film 21 located within the reading area. Light transmitted through film 21 that enters scanner body 12 is reflected by reflective mirror 95 and reaches light receiving plane of line sensor 97 through projection lens 52. Line sensor 97 allows only light that has been transmitted through a linear area on film 21 to reach light receiving plane 50. Subsequently, the image of the original on film 21 corresponding to the linear area is formed on light receiving plane 50 through the projection lens 52.

The linear area of film 21 read by line sensor 97 stretches along the direction of linearly arranged multiple photoelectric conversion elements (not shown) of line sensor 97. Moreover, the above described linear area is determined by the relative position of film 21 and optical block 51 at that time. In other words, the linear area is picked from a plane area on film 21 based upon the position of optical block 51.

As illustrated in FIGS. 5 and 6, supporting roller drive circuit 79 moves film supporting rollers 75 and 76 in a vertical direction I perpendicular to film passing plane 13C based upon instructions from CPU 61. Supporting roller drive circuit 79 moves film supporting rollers 75 and 76 downward when reading film 21 so that film supporting rollers 75 and 76 press film 21 against original placement plane 18 of platen glass 100 along film passing plane 13C, and maintains the current status of the interactive components.

As illustrated in FIG. 5, supporting roller drive circuit 79 moves film supporting rollers 75 and 76 to a set position above film passing plane 13C, when film 21 is moved by driving of DC motor 31, thereby maintaining film 21 away from original placement plane 18 of platen glass 100.

Projection lens 52, line sensor 97, printed circuit board 98, optical system drive circuit 66, line sensor drive circuit 67, signal processing circuit 68, and A/D converter 69 correspond to an image reading device. Belt 54, first pulley 55, stepping motor 53, and motor drive circuit 65 correspond to a moving device. Fork shaft 39, DC motor 31, take-up spool 32, and motor drive circuit 44 correspond to a delivery device. Plane lighting unit 74 and light source drive circuit 78 correspond to a lighting device. Projection lens 52 corresponds to an imaging optical device. Line sensor 97 corresponds to a photoelectric conversion device. Optical system drive circuit 66 corresponds to an adjustment device. Film supporting rollers 75 and 76, and supporting roller drive circuit 79 corresponds to a film position adjustment device. Magnetic head 37 and magnetic signal processing circuit 42 correspond to a magnetic information reading device and a magnetic information writing device.

Next, an explanation is provided regarding an operation of flat bed scanner 71 according to the second preferred embodiment of the present invention. Flat bed scanner 71 is capable of reading the images of both the reflective original and film 21 as described above. Since the procedures for reading the reflective original are the same as those of the first preferred embodiment of the present invention, an explanation of flat bed scanner 71 according to the second preferred embodiment has been limited to the operation for reading film 21 in order to simplify the description.

When reading film 21 using flat bed scanner 71 of the second preferred embodiment, a user enters information through an input device of host computer 14 to indicate that film 21 is to be read and to indicate the specified number of the frame on film 21 to be read, in the same manner as described in accordance with the first preferred embodiment. The user then loads cartridge 15 in flat bed scanner 71.

Host computer 14 sends the input information to CPU 61 as a film reading command. Upon receiving the film reading command, CPU 61 instructs memory 62 to store the number of the specified frame, and instructs light source drive circuit 64 to turn off light source 94. CPU 61 identifies the frame number of film 21 located on film passing plane 13C based upon the signal from film position detection sensor 36 while film 21 is advanced from cartridge 15 by driving DC motor.

When the identified frame number matches the specified frame number that has been stored in memory 62, CPU 61 determines that specified frame is located within the reading area between film supporting rollers 75 and 76, and stops movement of film 21. CPU 61 then instructs supporting roller drive circuit 79 to press film 21 against the original placement plane of platen glass 100 by moving film supporting rollers 75 and 76 downward. CPU 61 also instructs optical system drive circuit 66 to move projection lens 52 in the direction of the optical axis for positional adjustment so that the image of the original on film 21 is formed on light receiving plane 50 of line sensor 97 when the transmitting light from film 21 reaches the light receiving plane 50.

In addition, CPU 61 turns on plane lighting unit 74 using light source drive circuit 78. Light from plane lighting unit 74 simultaneously illuminates an entire section of a multiple number of image memory domain 22 corresponding to three frames on film 21 that are positioned within the reading area. CPU 61 rotates stepping motor 53 to move optical block 51 to the specified location so that the linear light transmitted through beginning point 40 of image memory domain 22 of the specified frame reaches light receiving plane 50 of line sensor 97. After converting the linear image signal of the specified frame into a digital signal using line sensor drive circuit 67, signal processing circuit 68 and A/D converter 69, CPU 61 outputs the digital signal to host computer 14.

CPU 61 executes the reading operation of the linear image signal by driving stepping motor 53 to move optical block 51 in direction A in constant, minute intervals of steps (minute movement). This minute movement is executed from beginning point 40 to ending point 41 of image memory domain 22 to be read.

The reading operation of image memory domain 22 is completed when the reading operation of the linear image signal is performed up to ending point 41 of image memory domain 22 and two dimensional image data is obtained. Subsequently, host computer 14 displays, on a monitor screen, the image of the image data that has been read. CPU 61 then repeats the image reading operation for remaining specified frames stored in memory 62 within the reading area.

If a multiple number of frames are specified when the film reading command is given, CPU 61 repeats the above described operations until the images of every specified frame have been read. When the reading operation of specified frames is completed, CPU 61 receives the eject command from host computer 14, thereby rewinding film 21 into cartridge 15.

As with the first preferred embodiment, it is also possible to read magnetic information stored in magnetic memory domain 25 of film 21, such as photographic conditions, using magnetic head 37. The magnetic information is then used to compensate for the image quality. In addition, it is also possible to write compensation parameters that are used in magnetic memory domain 25.

According to the second preferred embodiment, as explained above, since the frames located within a area where images can be read are pressed against original placement plane 50 of platen glass 100 by film supporting rollers 75 and 76 during reading of film 21, an image on film 21 is read at a focused position similar to that used for reading the reflective original, making the reading image more clear.

In addition, film 21 is moved above and away from the original placement plane of platen glass 100 in scanner body 12 or film passing plane 13C without being pressed by film supporting rollers 75 and 76 when moving film 21, thereby avoiding damage to the film surface.

According to the second preferred embodiment, multiple numbers of frames are contained within the area by film supporting rollers 75 and 76 and illuminated by plane lighting unit 74, thereby eliminating the need to move film 21 when executing the secondary scanning process for reading the image of the original on film 21. The multiple number of frames can be read by minutely moving optical block 51.

Flat bed scanner 71 of the second preferred embodiment may also be used directly for reading normal 35 mm film if cartridge 15 is not loaded.

In the second preferred embodiment, since film 21 is pressed against original placement plane 50 of platen glass 100 during reading of film 21, the location of a focal point of projection lens 52 is the same as when reading a reflective original or a normal transparent original. Thus, optical system drive circuit 66 for adjusting the position of projection lens 52 provided in the first preferred embodiment may be omitted.

In the above described second preferred embodiment, while plane lighting unit 74 includes a multiple number of light emitting diodes, plane lighting unit 74 may also include fluorescent lights outside of flat bed scanner 71 to serve as a light source with a plane light, so that the beam of the fluorescent light reaches transparent original adapter 73 through a diffusion panel.

Figure 7:
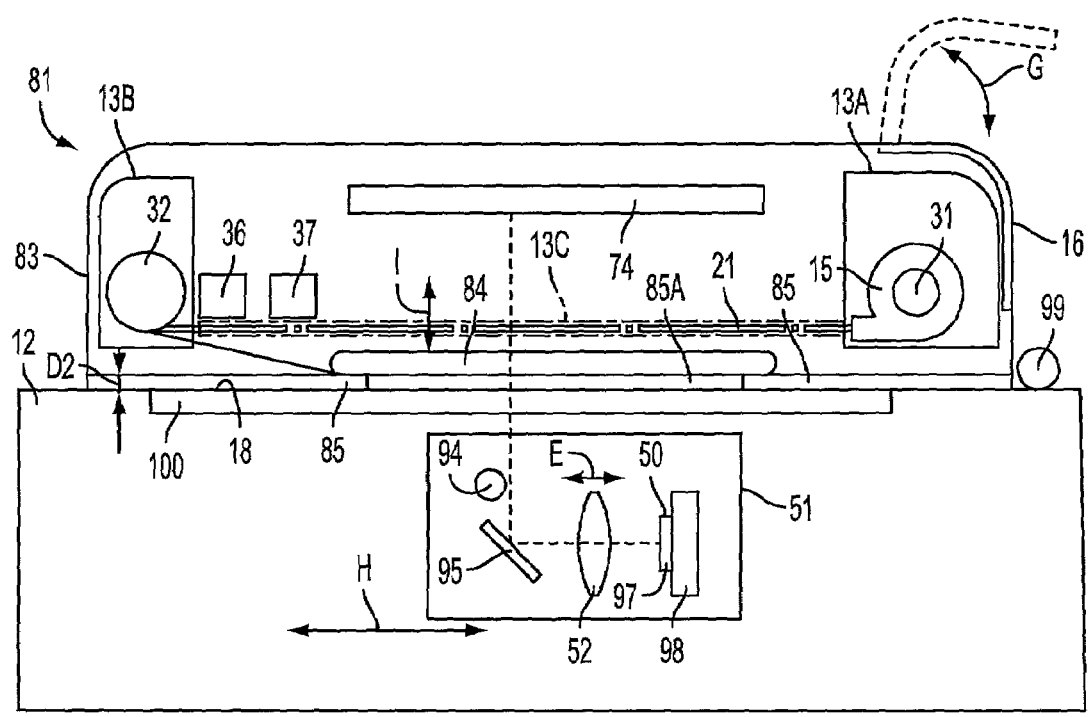
FIG. 7 is a cross-sectional view of a flat bed scanner according to a preferred embodiment of the present invention.
Figure 8:
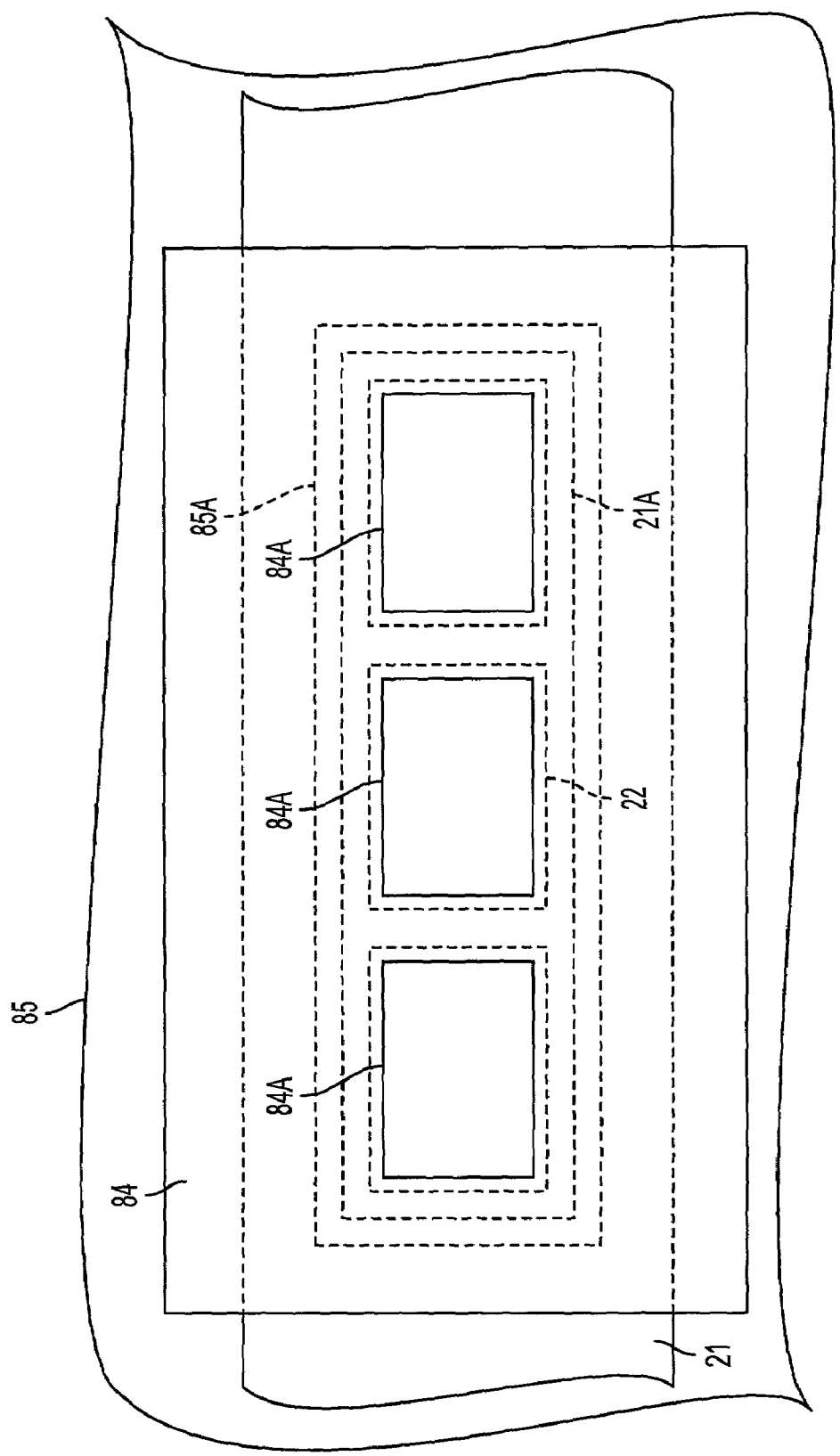
FIG. 8 is a detail view illustrating positions of a retaining plate and a masking plate in a transparent original adapter used with the flat bed scanner of FIG. 7.
Figure 9:
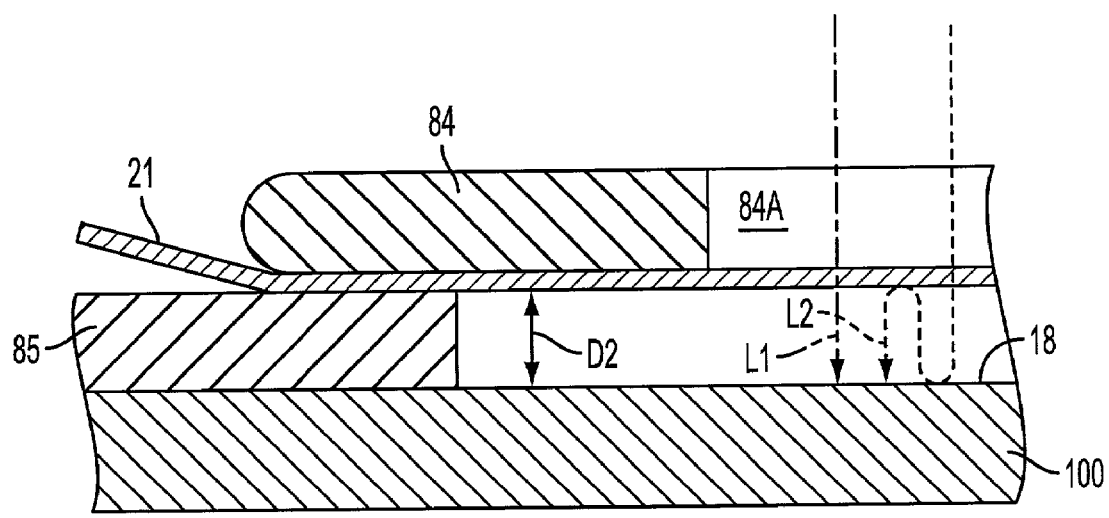
FIG. 9 is a cross-sectional view of a film being pressed against a masking plate by a retaining plate according to a preferred embodiment of the present invention.

Next, an explanation is provided regarding a flat bed scanner 81 according to a third preferred embodiment of the present invention. FIG. 7 is a cross-sectional view of an internal configuration of flat bed scanner 81 according to the third preferred embodiment. FIG. 8 illustrates positions of a retaining plate 84 and a masking plate 85 in a transparent original adapter 83 in the third preferred embodiment. FIG. 9 illustrates how film 21 is pressed against masking plate 85 by retaining plate 84.

Although capable of reading images of both the reflective original and film 21, an explanation of flat bed scanner 81 according to the third preferred embodiment of the present invention has been limited to reading images on film 21 in order to simplify the description.

When reading film 21, flat bed scanner 81 in the third preferred embodiment presses film 21 against original placement plane 18 of platen glass 100, similar to the second preferred embodiment. Flat bed scanner 81 according to the third preferred embodiment has retaining plate 84 rather than film supporting rollers 75 and 76 used in the second preferred embodiment.

A reading operation of the reflective original by flat bed scanner 81 of the third preferred embodiment is the same as with the first preferred embodiment. The exterior configuration of flat bed scanner 81 is also the same as with that of flat bed scanner 11 in the first preferred embodiment illustrated in FIG. 1. Moreover, the internal configuration of scanner body 12 of flat bed scanner 81 of the third preferred embodiment is the same as scanner body 12 in flat bed scanner 11 of the first preferred embodiment.

An explanation is provided below regarding the internal configuration of flat bed scanner 81 of the third preferred embodiment. In FIG. 7, the components that are identical to those illustrated in FIGS. 3 and 5 are labeled with the same numbers and the explanation thereof is omitted.

In transparent original adapter 83 of flat bed scanner 81 of the third preferred embodiment, retaining plate 84 is initially positioned above film passing plane 13C on which the surface of film 21 is located during film movement. Retaining plate 84 moves downward towards original placement plate 18 in a direction perpendicular to film passing plane 13C, and is controlled by a retaining plate drive circuit (not shown).

As illustrated in FIG. 8, retaining plate 84 is large enough to cover at least a reading area 21A, equivalent to three frames of film 21. Retaining plate 84 is made of a light shielding member, and includes three openings 84A which correspond to each image memory domain 22 within reading area 21A. Each opening 84A on retaining plate 84 is slightly smaller than image memory domain 22 on film 21.

By forming each opening 84A slightly smaller than image memory domain 22, the surface of film 21 outside of image memory domain 22 is not inadvertently read as image information even if movement in the secondary scanning direction, or direction A, of film 21 is somewhat offset from a desired location. The dimension of opening 84A is determined according to the size of image memory domain 22 and a control precision error by CPU 61 in direction H.

As illustrated in FIG. 7, masking plate 85 is positioned beneath retaining plate 84 on transparent original adapter 83 and has a specified film thickness D2. As illustrated in FIG. 8, opening 85A, which is smaller than the circumference of retaining plate 84 but larger than reading area 21A of film 21, is created on masking plate 85. As a result, opening 85A includes all of image memory domain 22 within reading area 21A.

As illustrated in FIG. 9, by positioning masking plate 85 under retaining plate 84, retaining plate 84 fixes film 21 at a position away from platen glass 100 at specified film thickness D2 when film 21 is pressed against platen glass 100 by retaining plate 84.

Retaining plate 84 is pressed against film 21 prior to the movement of optical block 51 during the secondary scanning process after movement of film 21 is completed. At this time, only light from plane lighting unit 74 passes through opening 84A of retaining plate 84 and illuminates image memory domain 22 on film 21 so that light is blocked for any portion other than image memory domain 22.

As illustrated in FIG. 7, retaining plate 84 is moved in vertical direction I perpendicular to film passing plane 13C by a drive mechanism (not shown) in a fashion similar to film supporting rollers 75 and 76 of the second preferred embodiment. The drive mechanism moves retaining plate 84 in vertical direction I according to a drive signal from a retaining plate drive circuit (not shown) upon receiving an instruction from CPU 61.

Because of the vertical movement of retaining plate 84, it is possible to fix multiple numbers of image memory domains 22 within reading area 21A on film 21 at locations that maintain a distance corresponding to specified film thickness D2 from the original placement plane of platen glass 100 when scanning the image of the original, and to separate retaining plate 84 completely from film 21 when moving film 21.

The electric configuration of flat bed scanner 81 according to the third preferred embodiment is similar to flat bed scanner 71 of the second preferred embodiment. Fat bed scanner 81 of the third preferred embodiment replaces supporting roller drive circuit 79 of the second preferred embodiment with the retaining plate drive circuit. Retaining plate drive circuit of transparent original adapter 83 is connected to CPU 61 through data bus 60 in the same manner as drive circuits 44, 78, 79 of the second preferred embodiment. The retaining plate drive circuit moves retaining plate 84 in vertical direction I perpendicular to the film surface of film 21 according to an instruction from CPU 61. As illustrated in FIG. 9, movement of film 21 by retaining plate 84 during a scanning procedure continues until film 21 is pressed against masking plate 85.

The retaining plate drive circuit moves retaining plate 84 above the set position of film passing plane 13C, away from film 21 during the movement of film 21, keeping film 21 away from masking plate 85. At this time, retaining plate 84 is positioned away from film 21.

In the third preferred embodiment of the present invention, platen glass 100, projection lens 52, line sensor 97, and printed circuit board 98 correspond to a reading device. DC motor 31 and take-up spool 32 correspond to a delivery device. Plane lighting unit 74 corresponds to a lighting device. Projection lens 52 corresponds to an imaging optical device. Line sensor 97 corresponds to a photoelectric conversion device. Retaining plate 84 and the retaining plate drive circuit correspond to a film position adjustment device. Opening 84A corresponds to a light transmitting portion. Masking plate 85 corresponds to a masking member. Specified film thickness D2 corresponds to a thickness of a masking member.

Since the reading procedure of the reflective original by flat bed scanner 81 is identical to that of the first preferred embodiment, an explanation thereof is omitted. Although the reading procedure of film 21 is similar that of the second preferred embodiment, in the third preferred embodiment CPU 61 drives the retaining plate drive circuit instead of supporting roller drive circuit 79. This difference is described below.

CPU 61 drives DC motor 31 according to a command indicating the specified frame from host computer 14. CPU 61 also monitors, according to signals from film position detection sensor 36, whether the specified frame on film 21 is moved to an area where the corresponding image is readable. Upon identifying that the specified frame has reached the area where the image is readable, CPU 61 stops movement of film 21 by DC motor 31.

Subsequently, CPU 61 moves retaining plate 84, using retaining plate drive circuit, according to the instruction to read film 21 received from host computer 14, and presses film 21 against masking plate 85 with retaining plate 84.

As noted above, as CPU 61 moves film 21 by identifying locations of specified frames, using perforations 23 and 24, according to a signal from film position detection sensor 36, image memory domain 22 on film 21 is aligned with opening 84A of retaining plate 84. At the same time, as film 21 is pressed against masking plate 85 with retaining plate 84, the image of the original on image memory domain 22 can be adequately read. A circumference, or negative base portion, of image memory domain 22 on film 21 is placed between retaining plate 84 and masking plate 85 and film 21 is pressed against masking plate 85.

As film 21 is pressed against masking plate 85 by retaining plate 84, a distance corresponding to film thickness D2 of masking plate 85 is maintained between image memory domain 22 on film 21 and original placement plane 18 of platen glass 100.

As illustrated in FIG. 6, CPU 61 aligns the location of a focal point of projection lens 52 with the film surface of film 21 located above platen glass 100 using optical system drive circuit 66 while image memory domain 22 on film 21 is sustained at a location maintaining the specified distance corresponding to film thickness D2 from the original placement plane 18 of platen glass 100. As a result, the image of the original in image memory domain 22 is more precisely read in the subsequent reading procedure, so that a more clear image is obtained.

As illustrated in FIG. 6, CPU 61 activates plane lighting unit 74 using light source drive circuit 78. The portion of film 21 outside image memory domain 22, or "negative base portion", is blocked from the light by retaining plate 84. As a result, a flare effect, caused by light entering line sensor 97 that passes through the negative base portion is prevented, and image memory domain 22 is more adequately irradiated. Thus, a more appropriate exposure is obtained for scanning the image of the original on image memory domain 22 by preventing the irradiation of the light onto the negative base portion as described above.

It is normally necessary to block light by painting the negative base portion of film 21 black, or adhering other light shielding film to film 21 to eliminate the flare effect. However, the need for such preventative measures is eliminated by retaining plate 84 of the third embodiment of the present invention.

As illustrated in FIG. 9, if there is a slight gap between the transparent original and original placement plane 18 when the transparent original is placed on platen glass 100, Newton rings are known to occur. More specifically, light L1 transmitted through the transparent original interferes with light L2 reflected at original placement plane 18 of platen glass 100 after having been transmitted once. In flat bed scanner 81 of the third preferred embodiment, film thickness D2 of masking plate 85 is maintained between film 21 and original placement plane 18 to prevent the occurrence of Newton's rings, resulting in a clearer image.

While opening 84A in retaining plate 84 is included in the third preferred embodiment, a light transmitting capacity could also be used in place of opening 84A.

Figure 10:
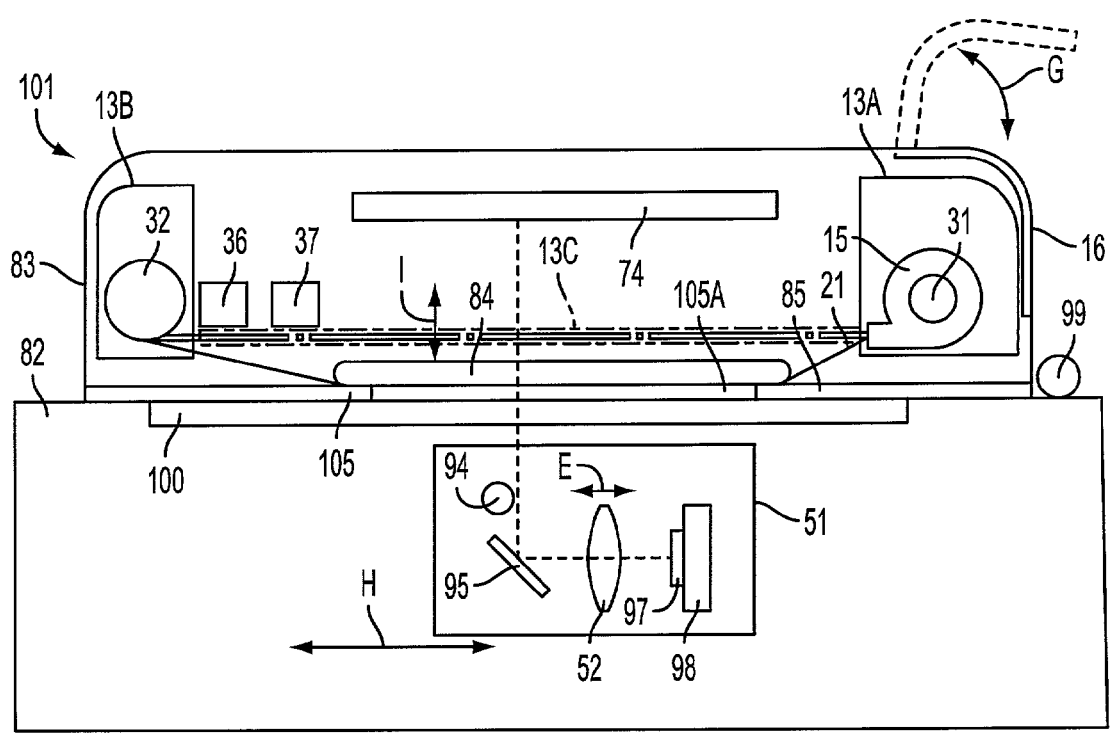
FIG. 10 is a cross-sectional view illustrating a variation of the flat bed scanner of FIG. 7.
Figure 11:
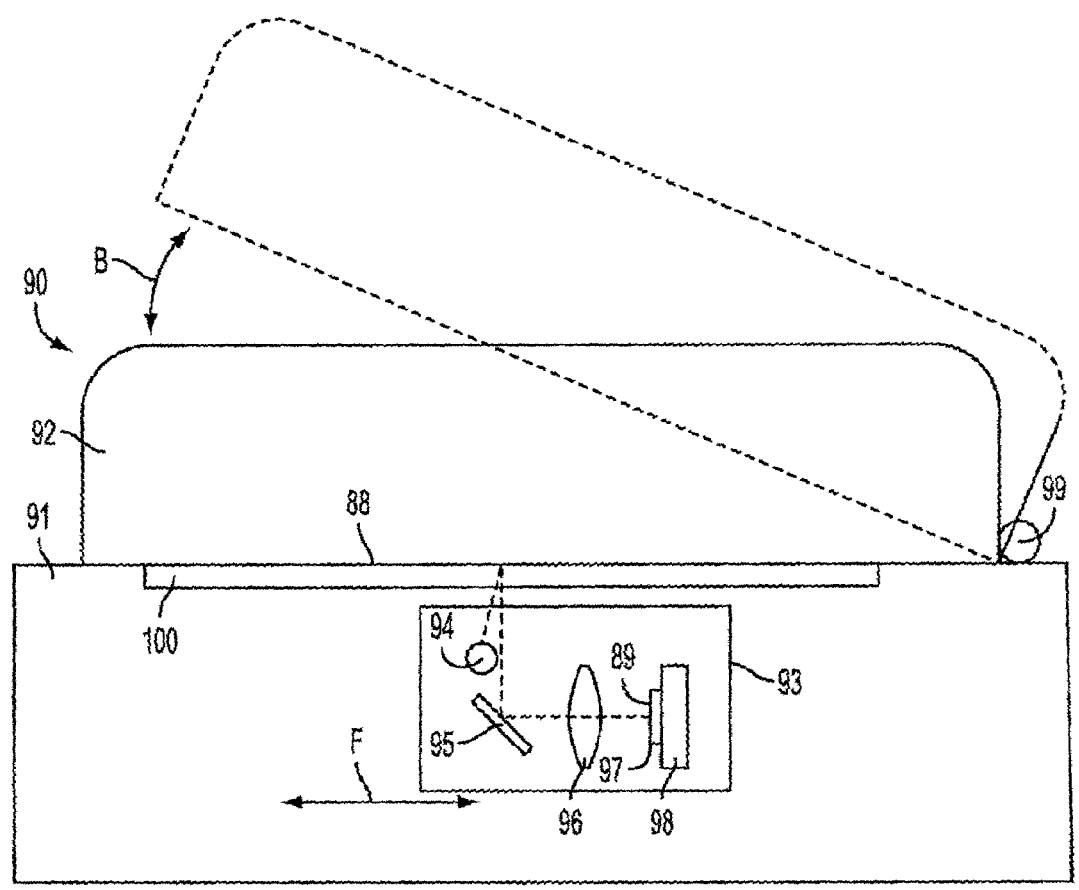
FIG. 11 is a cross-sectional view of a prior art flat bed scanner.

FIG. 10 is a cross-sectional view of an internal configuration of a flat bed scanner 101 according to a variation of the third preferred embodiment that replaces masking plate 85 of the third preferred embodiment with a light transmitting member, such as a glass plate 105 treated with a known anti-Newton ring process for an area equivalent to opening 85A. This anti-Newton ring process is applied only to the surface of glass plate 105 that contacts film 21. The anti-Newton ring process is executed, for example, by uniformly providing rounded, gradual convex and concave curves of approximately 10 μm in height and depth respectively on the surface of glass plate 105. The use of glass plate 105 applied with the anti-Newton ring process reduces Newton's rings in a way similar to masking plate 85 in the third preferred embodiment. In addition, a transparent plastic plate applied with the anti-Newton ring process may also be used in place of glass plate 105.

In the preferred embodiments of the present invention, perforations 23 and 24 are detected by film position detection sensor 36 when carrying film 21, and CPU 61 controls DC motor 31 and stepping motor 35 while monitoring signals from film position detection sensor 36. It is also acceptable to have DC motor 31 or stepping motor 35 carry film 21 while CPU 61 monitors the status of delivery of film 21 according to an output from line sensor 97.

In the preferred embodiments of the present invention, a white light source is described as the light source and a 3-line sensor as the line sensor. The transmitting light may also be separated into three colors using color filters, or a dichroic mirror, that are red, green, and blue, and the 3-line sensor may also be replaced with a monochromatic image sensor.

It is also acceptable to use colored light emitting diodes, or fluorescent tubes, that are red, green, and blue rather than a white light source. Three colors of light can be generated by attaching red, green, and blue filters on the white light source. A monochromatic image sensor may also be used in place of the 3-line sensor.

A color image for image data of an image plane is achieved by executing one of the following procedures, provided that light source 38 functions as three light sources. A "linear sequential" procedure may be used, where film 21 is repeatedly moved, one line at a time, after reading the data at the same linear image reading position three times by sequentially changing the three light emitting colors, or a "plane sequential" procedure may be used, where the data for one image plane is read for each light emitting color.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A transparent original adapter detachably connectable to an image reading apparatus having an image reading device that reads an image of an original placed on an original placement plane, the transparent original adapter comprising:
    a lighting device to project light from the transparent original adapter towards the original placement plane to illuminate the original;
    a delivery device to move the original along the original placement plane;
    the transparent original adapter being pivotally attached with the image reading apparatus;
    the transparent original adapter opening and closing by pivoting;
    the original placement plane appearing or being covered by the transparent original adapter; and
    the original placement plane being covered entirely by the transparent original adapter when the transparent original adapter is closed.

2. A transparent original adapter according to claim 1, wherein the original is a photographic film having an image memory domain.

3. A transparent original adapter according to claim 2, wherein the delivery device moves the film while maintaining a specified distance from the original placement plane.

4. A transparent original adapter according to claim 2, further comprising a film position adjustment device to adjust the film with respect to the original placement plane, wherein the film position adjustment device positions the film away from the original placement plane when the delivery device moves the film, and positions the film against the original placement plane when the reading device reads the image.

5. A transparent original adapter according to claim 4, the film position adjustment device further comprising a light shielding member having a light transmitting portion corresponding to the image memory domain of the film.

6. A transparent original adapter according to claim 2, further comprising a masking member having a thickness, positioned on the original placement plane, and having an opening corresponding to the image memory domain of the film, wherein the delivery device moves the film while maintaining a distance from the original placement plane greater than the thickness of the masking member.

7. A transparent original adapter according to claim 2, further comprising:
    a masking member positioned on the original placement plane and having an opening corresponding to the image memory domain of the film; and
    a film position adjustment device to adjust the film with respect to the masking member, wherein the film position adjustment device positions the film away from the masking member when the delivery device moves the film, and positions the film against the masking member when the reading device reads the image.

8. A transparent original adapter according to claim 7, the film position adjustment device further comprising a light shielding member having a light transmitting portion corresponding to the image memory domain of the film.

9. A transparent original adapter according to claim 2, further comprising a light transmitting member having a thickness, positioned on the original placement plane, and treated with an anti-Newton ring process at a location corresponding to the image memory domain of the film, wherein the delivery device moves the film while maintaining a distance from the original placement plane greater than the thickness of the light transmitting member.

10. A transparent original adapter according to claim 9, further comprising a film position adjustment device to adjust the film with respect to the light transmitting member, wherein the film position adjustment device positions the film away from the light transmitting member when the delivery device moves the film, and positions the film against the light transmitting member when the reading device reads the image.

11. A transparent original adapter according to claim 10, the film position adjustment device further comprising a light shielding member having a light transmitting portion corresponding to the image memory domain of the film.

12. A transparent original adapter according to claim 2, further comprising a magnetic information reading device to read magnetic information from the magnetic memory domain of the film.

13. A transparent original adapter according to claim 12, wherein the magnetic information reading device is positioned over the illuminated film.

14. A transparent original adapter according to claim 2, wherein the lighting device has a linear light source that emits a linear light that moves synchronously with the reading device.

15. A transparent original adapter according to claim 2, wherein the lighting device has a light source that emits a plane light.

16. A transparent original adapter according to claim 2, further comprising a magnetic information writing device to write magnetic information in the magnetic memory domain of the film.

17. The transparent original adapter according to claim 1, wherein the transparent original adapter covers the original.

18. An image reading apparatus to read a photographic image of a film, comprising:
   an original placement plane on which to place the film;
   a reading device to read the photographic image;
   a transparent original adapter, connected to the image reading apparatus, positioned over the original placement plane, and including a delivery device to move the film along the original placement plane, and a lighting device to illuminate the film;
   the transparent original adapter being pivotally attached with the image reading apparatus;
   the transparent original adapter opening and closing by pivoting;
   the original placement plane appearing or being covered by the transparent original adapter; and
   the original placement plane being covered entirely by the transparent original adapter when the transparent original adapter is closed.

19. An image reading apparatus according to claim 18, further comprising a moving device to move the reading device along the original placement plane, wherein the reading device reads the photographic image on the film as the moving device positions the reading device at a predetermined location and the delivery device moves the film.

20. An image reading apparatus according to claim 18, further comprising a moving device to move the reading device along the original placement plane, wherein the reading device reads the image on the film as the delivery device positions an image memory domain of the film at a predetermined location, and wherein the reading device reads the image of the film while the moving device moves the reading device.

21. An image reading apparatus according to claim 18, wherein the film includes an image memory domain and the reading device further comprises:
   an imaging optical device to form an image of the film;
   a photoelectric conversion device, having a light receiving plane, positioned in an image forming location of the imaging optical device to convert incoming light into an image signal; and
   an adjustment device to adjust optical positions between a picture formed position of the image memory domain by the imaging optical device, and the light receiving plane of the photoelectric conversion device to form the image.

22. An image readable apparatus according to claim 18, wherein the transparent original adapter is detachably connected to the image reading apparatus.

23. The image reading apparatus according to claim 18, wherein the transparent original adapter covers the film.

24. A transparent original adapter detachably connectable to an image reading apparatus that reads an image of an original, comprising:
   means for illuminating the original;
   means for moving the original along the original placement plane;
   the transparent original adapter being pivotally attached with the image reading apparatus;
   the transparent original adapter opening and closing by pivoting;
   the original placement plane appearing or being covered by the transparent original adapter; and
   the original placement plane being covered entirely by the transparent original adapter when the transparent original adapter is closed.

25. The transparent original adapter detachably connectable to the image reading apparatus according to claim 24, wherein the transparent original adapter covers the original image.

26. A transparent original adapter detachably connectable to an image reading apparatus having an image reading device that reads an image of an original placed on an original placement plane, the transparent original adapter comprising:
   a lighting device to project light from the transparent original adapter towards the original placement plane to illuminate the original;
   a delivery device to move the original, which is a photographic film having an image memory domain, along the original placement plane; and
   a film position adjustment device to adjust the film with respect to the original placement plane, wherein the film position adjustment device positions the film away from the original placement plane when the delivery device moves the film, and positions the film against the original placement plane when the reading device reads the image.

27. A transparent original adapter detachably connectable to an image reading apparatus having an image reading device that reads an image of an original placed on an original placement plane, the transparent original adapter comprising:
   a lighting device to project light from the transparent original adapter towards the original placement plane to illuminate the original;
   a delivery device to move the original, which is a photographic film having an image memory domain, along the original placement plane; and
   a masking member having a thickness, positioned on the original placement plane, and having an opening corresponding to the image memory domain of the film, wherein the delivery device moves the film while maintaining a distance from the original placement plane greater than the thickness of the masking member.

28. A transparent original adapter detachably connectable to an image reading apparatus having an image reading device that reads an image of an original placed on an original placement plane, the transparent original adapter comprising:

a lighting device to project light from the transparent original adapter towards the original placement plane to illuminate the original;

a delivery device to move the original, which is a photographic film having an image memory domain, along the original placement plane;

a masking member positioned on the original placement plane and having an opening corresponding to the image memory domain of the film; and a film position adjustment device to adjust the film with respect to the masking member, wherein the film position adjustment device positions the film away from the masking member when the delivery device moves the film, and positions the film against the masking member when the reading device reads the image.

29. A transparent original adapter detachably connectable to an image reading apparatus having an image reading device that reads an image of an original placed on an original placement plane, the transparent original adapter comprising:

a lighting device to project light from the transparent original adapter towards the original placement plane to illuminate the original;

a delivery device to move the original, which is a photographic film having an image memory domain, along the original placement plane; and a light transmitting member having a thickness, positioned on the original placement plane, and treated with an anti-Newton ring process at a location corresponding to the image memory domain of the film, wherein the delivery device moves the film while maintaining a distance from the original placement plane greater than the thickness of the light transmitting member.

* * * * *